United States Patent
Lewis et al.

(10) Patent No.: US 12,284,090 B2
(45) Date of Patent: *Apr. 22, 2025

(54) EDGE-BASED ARTIFICIAL INTELLIGENCE ENABLEMENT

(71) Applicant: CenturyLink Intellectual Property LLC, Broomfield, CO (US)

(72) Inventors: Ronald A. Lewis, Montgomery, AL (US); Alison Grayson, Lone Tree, CO (US); Carlos Santiago, Aurora, CO (US)

(73) Assignee: CenturyLink Intellectual Property LLC, Denver, CO (US)

( * ) Notice: Subject to any disclaimer, the term of this patent is extended or adjusted under 35 U.S.C. 154(b) by 32 days.

This patent is subject to a terminal disclaimer.

(21) Appl. No.: 18/241,605

(22) Filed: Sep. 1, 2023

(65) Prior Publication Data

US 2023/0412471 A1 Dec. 21, 2023

Related U.S. Application Data

(63) Continuation of application No. 18/078,680, filed on Dec. 9, 2022, now Pat. No. 11,750,469, which is a
(Continued)

(51) Int. Cl.
*H04L 41/16* (2022.01)
*H04L 41/14* (2022.01)

(52) U.S. Cl.
CPC ............ *H04L 41/16* (2013.01); *H04L 41/145* (2013.01)

(58) Field of Classification Search
CPC .......... H04L 41/16; H04L 67/56; H04L 67/10
See application file for complete search history.

(56) References Cited

U.S. PATENT DOCUMENTS 9,294,507 B1 * 3/2016 Roth ..................... H04L 63/105
10,970,113 B1 4/2021 Kurtzer
(Continued)

OTHER PUBLICATIONS

International Search Report and Written Opinion of the International Searching Authority, dated Jun. 14, 2022, Int'l Appl. No. PCT/US22/070476, Int'l Filing Date Feb. 2, 2022; 17 pgs.
(Continued)

*Primary Examiner* — David R Lazaro

(57) ABSTRACT

An edge computing telecommunications network is provided for efficiently generating and updating computing models for use at distributed devices connected to different edge compute sites of the network. A network orchestration system may track devices connected to the network and the edge compute sites to which they are connected. The devices may comprise limited computing power and may include sensors or other data collection mechanisms. Raw data may be provided from connected devices to one or more edge compute sites. Edge compute sites may be instructed, e.g., by the network orchestration system, whether to replicate the raw data, modify the data to make it ready for consumption by a computing model, replicate the modified data, refine the computing model, replicate the refined computing model, and/or share some or all of the raw data, modified data, and/or refined computing model with other edge computing sites and/or connected devices.

18 Claims, 5 Drawing Sheets

Related U.S. Application Data continuation of application No. 17/649,731, filed on Feb. 2, 2022, now Pat. No. 11,528,193.

(60) Provisional application No. 63/152,139, filed on Feb. 22, 2021.

(56) References Cited

U.S. PATENT DOCUMENTS

| | | | | |
|---|---|---|---|---|
| 11,373,119 | B1* | 6/2022 | Doshi | H04L 47/70 |
| 11,528,193 | B2* | 12/2022 | Lewis | H04L 41/145 |
| 11,593,500 | B1* | 2/2023 | Coenders | H04L 63/102 |
| 11,750,469 | B2* | 9/2023 | Lewis | H04L 67/10 |
| | | | | 709/224 |
| 11,762,442 | B1* | 9/2023 | Merli | G06F 1/3296 |
| | | | | 713/310 |
| 2017/0104755 | A1* | 4/2017 | Arregoces | H04L 67/10 |
| 2019/0036716 | A1* | 1/2019 | Kasaragod | H04L 63/104 |
| 2020/0285523 | A1 | 9/2020 | Bernat | |
| 2020/0327371 | A1* | 10/2020 | Sharma | H04L 67/34 |
| 2021/0014114 | A1 | 1/2021 | Doshi | |
| 2021/0064941 | A1* | 3/2021 | Khan | G06N 5/04 |
| 2022/0210041 | A1 | 6/2022 | Gandhi | |
| 2022/0272000 | A1* | 8/2022 | Lewis | H04L 41/16 |
| 2023/0107501 | A1* | 4/2023 | Lewis | H04L 67/56 |
| | | | | 709/224 |
| 2023/0412471 | A1* | 12/2023 | Lewis | H04L 41/16 |

OTHER PUBLICATIONS

International Preliminary Report on Patentability, dated Aug. 31, 2023, Int'l Appl. No. PCT/US2022/070476, Int'l Filing Date Feb. 2, 2022; 13 pgs.

* cited by examiner

US 12,284,090 B2

EDGE-BASED ARTIFICIAL INTELLIGENCE ENABLEMENT

BACKGROUND

Edge computing is a computing architecture in which computations and/or data storage is performed physically and/or logically near a location of an entity that requested these services. The proximity of the requesting computing device to the computing device(s) that perform the computations and/or data storage saves bandwidth and reduces latency.

SUMMARY

Examples of the present disclosure relate to an edge-based telecommunications network that enables efficient use of artificial-intelligence and/or machine-learning models. For example, a method is provided comprising: receiving, at a first edge compute site of a telecommunications network, raw data from a first device over a first access network; determining, by the first edge compute site, whether to send the raw data to a second edge compute site of the telecommunications network; when it is determined to send the raw data to the second edge compute site of the telecommunications network, sending, by the first edge compute site, the raw data to the second edge compute site; determining, by the first edge compute site, whether the raw data needs to be modified for consumption by a first model that is stored by one of the first edge compute site, the second edge compute site, the first device, or a second device connected to the first edge compute site; when it is determined that the raw data needs to be modified for consumption by the first model, modifying the raw data to generate modified data; determining, by the first edge compute site, whether to provide the modified data to at least one of the second edge compute site, the first device, or the second device; when it is determined to provide the modified data to at least one of the second edge compute site, the first device, or the second device, providing the modified data to at least one of the second edge compute site, the first device, or the second device; determining, by the first edge compute site, whether to modify the first model at the first edge compute site using the modified data; when it is determined to modify the first model at the first edge compute site, modifying the first model using the modified data to generate a modified first model; determining, by the first edge compute site, whether to send the modified first model to at least one of the second edge compute site, the first device, or the second device; when it is determined to send the modified first model to at least one of the second edge compute site, the first device, or the second device, sending the modified first model to at least one of the second edge compute site, the first device, or the second device; and using the modified first model to automatically affect operation of at least one of the first edge compute site, the second edge compute site, the first device, or the second device.

In other examples, a system is provided comprising at least one processor and memory, operatively connected to the at least one processor and storing instructions that, when executed by the at least one processor, cause the system to perform a method. In examples, that method may comprise: receiving, at a first edge compute site of a telecommunications network, raw data from a first device over a first access network; determining, by the first edge compute site, whether to send the raw data to a second edge compute site of the telecommunications network; when it is determined to send the raw data to the second edge compute site of the telecommunications network, sending, by the first edge compute site, the raw data to the second edge compute site; determining, by the first edge compute site, whether the raw data needs to be modified for consumption by a first model that is stored by one of the first edge compute site, the second edge compute site, the first device, or a second device connected to the first edge compute site; when it is determined that the raw data needs to be modified for consumption by the first model, modifying the raw data to generate modified data; determining, by the first edge compute site, whether to provide the modified data to at least one of the second edge compute site, the first device, or the second device; when it is determined to provide the modified data to at least one of the second edge compute site, the first device, or the second device, providing the modified data to at least one of the second edge compute site, the first device, or the second device; determining, by the first edge compute site, whether to modify the first model at the first edge compute site using the modified data; when it is determined to modify the first model at the first edge compute site, modifying the first model using the modified data to generate a modified first model; determining, by the first edge compute site, whether to send the modified first model to at least one of the second edge compute site, the first device, or the second device; when it is determined to send the modified first model to at least one of the second edge compute site, the first device, or the second device, sending the modified first model to at least one of the second edge compute site, the first device, or the second device; and using the modified first model to automatically affect operation of at least one of the first edge compute site, the second edge compute site, the first device, or the second device.

In other examples, a method is provided comprising: determining, by a network orchestration system of an edge telecommunications network, a first set of one or more edge compute sites currently connected to at least one device utilizing a first model; determining, by the network orchestration system of the edge telecommunications network, a second set of one or more edge compute nodes currently connected to at least one device utilizing a second model; providing, by the network orchestration system, first instructions to the first set of one or more edge compute sites, the first instructions comprising: whether and where to replicate raw data received from the at least one device utilizing the first model; whether to modify the raw data at the first set of one or more edge compute sites to generate first modified data; whether and where to replicate the first modified data to one or more other edge compute sites in the first set; whether to modify the first model at the first set of one or more edge compute sites to generate a first modified model; and whether and where to replicate the first modified model. In examples, the method may also comprise: providing, by the network orchestration system, second instructions to the second set of one or more edge compute sites, the second instructions comprising: whether and where to replicate raw data received from the at least one device utilizing the second model; whether to modify the raw data at the second set of one or more edge compute sites to generate second modified data; whether and where to replicate the second modified data to one or more other edge compute sites in the second set; whether to modify the second model at the second set of one or more edge compute sites to generate a second modified model; and whether and where to replicate the second modified model.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

Figure 1:
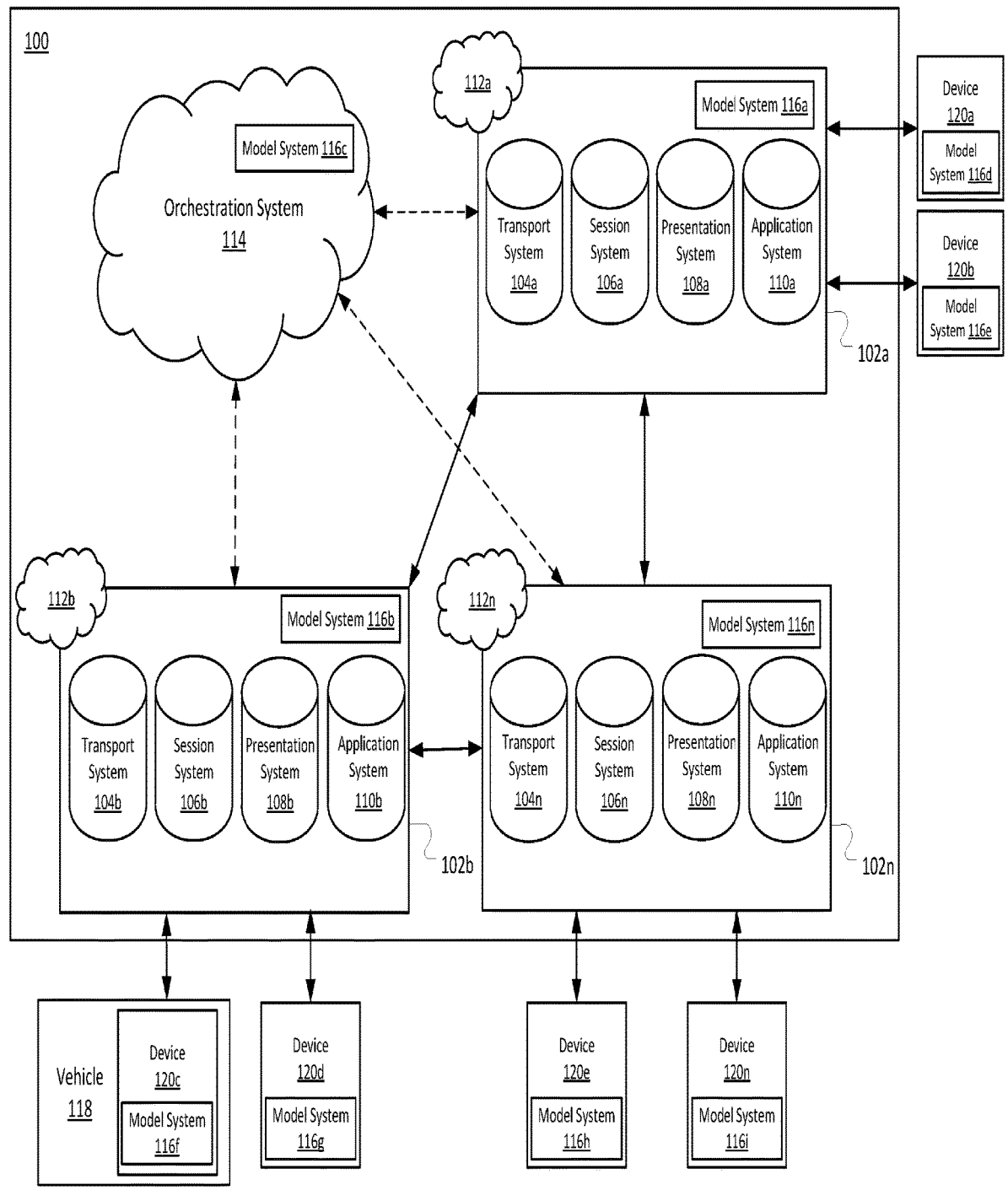
FIG. 1 is a schematic diagram illustrating an edge telecommunications network system in accordance with one embodiment.

Models, such as artificial intelligence models, continuously improve through data consumption. For example, a self-driving model will be refined from data obtained from a moving vehicle using the model. The model may use data such as images captured while the vehicle moves, sensor data, engine data, and other data. There can be a large amount of data available to refine a model. Additionally, the data may need to be modified before the model can use the data. Devices using a model may not have the ability to collect and store the large amount of data fast enough, if at all, to efficiently refine the model. Similarly, the devices using a model may not have the ability to modify or refine the data for the model's use. Models that do not improve quickly enough may fail. For example, a vehicle using a self-driving model that cannot quickly improve the model itself or cannot quickly communicate with other devices that collect data, modify data, and/or improve the model, due to high latency, may crash or otherwise operate incorrectly. Models used by devices may also improve inefficiently if data collection is limited. For example, a self-driving model that only accesses data associated with a single vehicle will not improve as quickly or efficiently as a self-driving model that accesses data associated with a large number of vehicles. In other examples, the model may comprise a model used to predict failures of network computing cards in a server or other computing device. For example, an organization may own or control thousands of computing devices within a computing system, and the organization may benefit from generating and refining models used to predict computing system failures before they occur so that remedial measures can be taken.

Communications networks may provide many services to customers and/or devices associated with customers of the network, including transmission of communications between network devices, network services, network computing environments, cloud services (such as storage services, networking service, compute services, etc.), and the like. To provide services such as data collection, data modification, and model refining, networking components and other devices are interconnected and configured within the network such that devices may access the communications network. Edge sites of the communications network may be in many locations to lower the latency when a device accesses the network. The edge sites may allow data to be collected from devices, allow the data to be shared to other sites, allow the data to be modified for use by models, and allow for the models to be refined for use by the devices, all with low latency. The communications network may have much more processing power than the individual devices using the network to collect and process data quickly.

Aspects of the present application describe an edge telecommunications network system that can enable devices using models such as artificial-intelligence/machine-learning models to operate. The edge telecommunications network system may collect data from devices in communication or otherwise connected to the edge telecommunications network system such as via one or more edge compute sites of the system. The collected data may be shared with other edge sites so devices located anywhere and communicating with the system will have access to the same data. The collected data may be modified so that models can be refined by using the modified data. The modified data may be used to refine models stored on the system or may be accessible to the devices to refine models not stored on the system, such as stored on the devices themselves.

The edge telecommunications network system can enable devices using models such as artificial intelligence models to operate using data layers. For example, the edge telecommunications network system may use a four-tier data model, including a data transport layer, a data session layer, a data presentation layer, and a data application layer. The data transport layer defines participants of the network and manages the communication infrastructure. The data session layer replicates data using a distributed data tier. For example, the data session layer may cause the edge sites of the edge telecommunications network system to continuously/periodically communicate and/or replicate data to maintain data concurrency throughout the network. The data presentation later ingests data such as data received from devices communicating with or otherwise connected to the edge telecommunications network system, and the data presentation layer modifies data. In one example, the data is modified to be ready for use to refine an artificial-intelligence or machine-learning model. The data presentation layer can modify the data based on the model(s) that will use the data and the use cases and intents of the model(s). The data application layer is the set of microservices and Application Programming Interfaces (APIs) that interact with the devices. The edge telecommunications network system may provide or otherwise cause the microservices and APIs to be accessible by the devices connected to the edge telecommunications network system.

The edge telecommunications network system may also include an orchestration system. The orchestration system can communicate with and control edge sites of the edge telecommunications network system. The orchestration system can configure and provision the edge sites and establish how the edge site should function. The orchestration system can provide rules or other instructions to the systems implementing the individual data layers to direct those systems how to function. For example, the orchestration system may instruct the transport layer system of the edge sites which other edge sites to share/replicate data with.

FIG. 1 is a schematic diagram illustrating an edge telecommunications network system 100 in accordance with one embodiment. In general, the edge telecommunications network system 100 may include edge compute sites 102*a-n* and an orchestration system 114. Each edge compute site 102*a-n* may provide compute, data, and capability services to devices, such as devices 120*a-n*, connected or otherwise in communication with the edge compute site. In some embodiments, the edge compute sites 102*a-n* operate according to the data layer constructs described above, but FIG. 1 illustrates the data layers as systems in the present embodiment. In examples, the systems 104, 106, 108, and 110 may be separate systems and/or may be combined. For example, transport system 104 and session system 106 may be implemented by a single database replication system. The edge compute sites 102a-n may be in different geographic locations of the edge telecommunications network system 100 to reduce the latency of providing services to devices in communication with or otherwise connected to the edge telecommunications network system 100. For example, a device, such as device 120c or device 120d, may be located near edge compute site 102b and receiving services will therefore be fastest when provided by edge compute site 102b. Device 120c or device 120d receiving the same services from edge compute site 102a or edge compute site 102n may be slower due to the greater distances of the edge compute sites from the device. The device, such as device 120c or device 120d, may communicate or otherwise connect to the edge compute sites, such as edge compute site 102b, via networks 112a-n. The networks 112a-n can include one or more data communication networks, such as the Internet, private networks, cellular data communication networks, local area networks, and the like. The interactions and communications between the components of the edge telecommunications network system 100 is described in more detail herein. It should be appreciated that an edge telecommunications network system may include more or fewer components than those illustrated in FIG. 1 and may be connected in other configurations than shown. Rather, the system 100 of FIG. 1 is but one example of an edge telecommunications network system 100 for providing compute, data, and capability services to devices or networks connected to or otherwise in communication with the edge compute system.

In examples, devices 120a-n may change which edge compute site to communicate with to connect to the edge telecommunications network system 100. For example, the device may be a moving vehicle or be connected to the moving vehicle (e.g., vehicle 118). The device, such as device 120c may have originally communicated with or otherwise connected to edge compute site 102n because it was closest to and had the lowest latency when communicating with edge compute site 102n. As the vehicle moved, device 120c moved away from edge compute site 102n and closer to edge compute site 102b. Therefore, device 120c starts to communicate with edge compute site 102b, which now has the lowest latency when communicating with device 120c, rather than edge compute site 102n. Devices communicating with the edge telecommunications network system 100 can continuously change which edge compute site the devices communicate with, but some devices may be stationary and always communicate with the same edge compute site. In other examples, the devices 120a-n may comprise mobile computing devices (such as wireless phones, laptops, tablets, etc.). In other examples, the devices 120a-n may comprise computing servers or other computing devices at an organization's office locations, each of which may connect to a different (logically closest) edge site 102a-n within edge telecommunications network system 100.

In examples, the edge telecommunications network system 100 stores and/or maintains one or more models such as an artificial-intelligence (AI) model or machine-learning (ML) model. In some examples, the one or more models are generated and/or stored at one or more of the edge compute sites 102a-n in model systems 116a-n. For example, in Python, a binary representation of a model may be stored in model systems 116a-n. The models can be provided to devices in communication with or otherwise connected to the edge telecommunications network system 100. The models may be generated, refined, and/or stored at the edge compute sites 102a-n in model systems 116a-n to reduce the latency of providing the models or model updates to the devices. Each model may be stored at one of the edge compute sites based on whether a device that communicates with the specific edge site uses the model. For example, a device may communicate with edge compute site 102b to connect to the edge telecommunications network system 100. In an example, the device, such as device 120c, is a vehicle control unit that uses a driving assist model. Model system 116f may store the driving assist model for vehicle 118 to use. Device 120c may be a vehicle-to-everything (V2X) communication device that allows vehicle 118 to communicate with the edge telecommunications network system 100 or to other V2X devices that, themselves, pass data to and from the edge telecommunications network system 100. Device 120c may also collect data such as from cameras, vehicle sensors, and/or other vehicles or devices monitoring the operation of the vehicle to subsequently send the collected data to the edge telecommunications network system 100.

In some examples, certain model(s) are stored in the orchestration system 114 and specifically in model system 116c. For example, the orchestration system 114 may receive raw data or modified data from one or more of the edge compute sites 102 and use it to modify the model stored in model system 116c. In other examples, the model may be generated and refined by the edge compute site(s) 102 before being provided to the orchestration system 114. In further examples, the model(s) are created, stored, and refined on the devices 120. For example, the model(s) that each device 120a-n use are stored in model systems 116d-i. The devices may communicate with the edge telecommunications network system 100 to receive data that will be used to refine the model(s) stored in model systems 116d-i. For example, device 120c may receive data from the edge telecommunications network system 100. The data may be data collected by device 120c (and refined by edge telecommunications network system 100 for consumption by the model system 116f) and/or from other devices communicating with the edge telecommunications network system 100. The data may also be modified to be used by the model (such as a self-driving model) stored in model system 116f. As used herein, modified data (or refined data) means raw data received from a device 120 and modified by presentation system 108 in order to extract features or normalize the raw data for use in one or more model systems 116. Model system 116f can use the modified data received from the edge telecommunications network system 100 to refine the stored self-driving model.

The edge compute sites 102a-n may receive data from devices connected to the edge telecommunications network system 100. Each device may communicate with and send data to one or more of the edge compute sites 102a-n such as by networks 112a-n. For example, each device 120 may communicate with and send data to the edge compute site 102 having the lowest latency to communicate with and send data to. The received data may include data necessary to enable and/or refine models used by the devices and/or capabilities of the devices. For example, a device connected to the edge telecommunications network system 100 may send data to be used to update a model to ensure that the device and/or systems in communication with and/or controlled by the device operate properly.

In an example, device 120a is a system controlling an oil drill and responsible for preventing the drill from overheating. Device 120a may collect data (e.g., sensor data about the oil drill such as the drill speed, the soil characteristics, the operating temperature, and so on) and send it to edge compute site 102a. The edge telecommunications network system 100 can use the data to continuously update and/or refine the model used by the device and/or capabilities of the device. Additionally, the data may be used to update and/or refine the models used by other devices and/or the capabilities of other devices connected to the edge telecommunications network system 100. For example, device 120a may send data collected when an oil drill overheats. The data can be used to refine the model, such as to prevent the drill (or similar drills) from failing for the same or similar reasons. The refined artificial-intelligence and/or machine-learning model can then be used by other devices, such as device 120b, device 120e, and so on, so the oil drill(s) the devices control do not overheat in the future for the same or similar reasons. Alternatively, orchestration system 114 may determine that the model (and the data used to refine the model) need not be replicated because it is specific only to the device 120a, which is stationary and always communicates with edge compute site 102a (and no other sites). As such, the orchestration system 114 may instruct the edge compute site 102a not to replicate or send the data to any of the other edge compute sites 102b-n. In other examples, the edge compute sites 112 may communicate directly with one another to subscribe and/or unsubscribe to receive updates of relevant raw data, modified data, and/or refined/updated models.

In an example, the edge compute sites 102a-n do not refine the model; rather, they replicate either raw or modified data that is then consumed by model systems 116d-i. For example, the data collected by device 120a is received by edge compute site 102a and shared with edge compute site 102n. In one example, the data is modified, such as by presentation system 108a and/or presentation system 108n, as will be described in more detail herein. The edge compute sites may then share the data with the devices so individual models stored on devices 120 can be refined. For example, the data shared by device 120a regarding the oil drill overheating can be shared with edge compute site 102n and modified by presentation system 108n for consumption by device 120e. The modified data may then be sent to device 120a and device 120e. The modified data can then be used by model system 116d and model system 116h to refine the model that is used by device 120a and device 120e to prevent oil drills from overheating. Device 120e may also send data to edge compute site 102n. The data may then be modified and shared with device 120a and device 120e for model system 116d and model system 116i to refine the model used to control oil drills again.

Each edge compute site 102a-n may include a transport system 104a-n. The transport systems 104a-n may determine the edge compute site(s) that each edge compute site should share data with or otherwise connect to. In examples, the transport systems 104a-n determine which edge compute site(s) the edge compute sites 102a-n should replicate data to based on the devices connected to each edge compute site 102 and the data in question. For example, edge compute site 102a may connect and replicate data to both edge compute site 102b and edge compute site 102n because each edge compute site is communicating with devices that use the same model or a similar model. In an example, the transport systems 104a-n comprise database systems powered by software like HarperDB provided by HarperDB Inc. For example, transport systems may comprise database systems that permit operational technology systems (such as sensors, monitoring systems, etc.) to easily integrate their data with information technology systems (such as event logs).

In examples, the device 120c may be connected to or part of vehicle 118. A vehicle is traditionally an operational technology (OT) environment comprised of multiple sensors collecting various types of data used to enable the driver or pilot to manage the vehicle more effectively. In examples, the device 120c may comprise an onboard diagnostic II (ODB2) interface connected to a Raspberry Pi running HarperDB to collect and transmit the data using native Harper DB to network 100. Harper DB is a lightweight, highly scalable hybrid database, small enough to run on a micro controller in a supervisory control and data acquisition (SCADA) environment, and scalable enough to handle petabytes of data in a deployment on network 100. Because this allows data from sensors, controllers, and syslog servers to be natively ingested, it can be used as a portable data abstraction layer. Raw data can then be retrieved from nearly any device, regardless of protocol or interface, and exposed to the presentation system 108 for ingestion. The transport systems 104 can also act as a data replication engine—providing a reliable data transport in unreliable, changing network conditions by implementing it as an edge data persistence layer and allowing it to find a reliable network transport, holding the data until the network becomes available. For example, the lightweight database can be deployed in vehicles and using adhoc networking to collect and transmit data from remote locations. An edge compute site 102 can pick up data from a remote data node or device as the transport node in a vehicle drives past a warehouse with a remote data node. In examples, the vehicle transports the data to the remote data node either over cellular from inside the vehicle or via wifi when it comes in range of a paired wifi infrastructure.

The transport systems 104 may also determine what specific data collected from the devices connected to the edge telecommunications network system 100 to share with other edge compute sites. For example, assume edge compute site 102a and edge compute site 102b both communicate with and connect to devices that control oil drills. Edge compute site 102a receives data about a drill overheating from a device via network 112a. The transport system 104a determines to send the received data to edge compute site 102b so the data can be sent to devices in communication with edge compute site 102a and with edge compute site 102b. The devices 120 use the data to refine one or more model(s), such as a model stored in model systems 116d-g, used by the devices to prevent the oil drill(s) from overheating. Alternatively, the transport system 104a determines to send the received raw data to edge compute site 102b so both edge compute sites 102a and 102b can refine the model. In this example, edge compute site 102n may not communicate with any devices that prevent oil drills from overheating. Thus, even though the transport system 104a previously determined that edge compute site 102a and edge compute site 102n should share data, the transport system 104a determines that the received data should not be sent to the edge compute site 102n because edge compute site 102n does not communicate with any devices that use the data. In other examples, the data is shared with edge compute site 102n to maintain data consistency and/or so it is available if a device connects to edge compute site 102n in the future and needs the data. Additionally, a device connected to edge compute site 102n may begin using a model that uses the data.

The transport systems 104*a-n* may group devices that use a similar model to determine when an edge compute site 102 should share data. In examples, the transport systems 104*a-n* track when devices switch to communicating with a different edge compute site, and when devices start and stop using a model to determine which edge compute sites should share data with other edge compute sites. The groups may be continuously updated so the edge compute sites share data only with edge compute sites that need it. In examples, orchestration system 114 may provide instructions to the transport systems 104*a-n* to instruct the transport systems 104*a-n* as to particular data-replication groups. As mentioned above, some devices are stationary and always communicate with the same edge compute site. In examples, the transport systems 104*a-n* may not waste resources tracking stationary devices to determine whether the device is communicating with a different edge compute site.

In another example, edge compute site 102*b* and edge compute site 102*n* may both communicate with devices that utilize a driving assist model, and edge compute site 102*a* may not communicate with any devices that utilize a driving assist model. In this example, transport system 104*b* may determine that any collected data related to the driving assist model should be shared with edge compute site 102*n* and not with edge compute site 102*a*, and transport system 104*n* will determine that any collected data related to the driving assist model should be shared with edge compute site 102*b* and not shared with edge compute site 102*a*. The transport systems 104*b* may determine that any number of edge compute sites should receive data for each model the edge compute site collects related data. In examples, the transport systems store the collection of edge compute sites that should receive data for each model for future reference. This allows the transport systems 104 to avoid having to determine which edge compute sites should be sent data every time data is received. The transport systems may update the stored collections periodically.

The transport systems 104*a-n* may still share data with other edge compute sites that do not communicate with any devices using the model(s) related to the collected data. For example, the transport systems may determine that an edge compute site is likely to connect to devices that will use the model(s) in the future. The transport systems may additionally share data with only a subset of the edge compute sites. For example, each of the transport systems may cause each edge compute site to only share data with edge compute sites within a geographic area. As the edge compute site shares data with the edge compute sites in the geographic area, the other edge compute sites can send the data to other edge compute sites that are determined to need the data. For example, edge compute site 102*a* may send data to edge compute site 102*b*, and edge compute site 102*b* will subsequently send the data to edge compute site 102*n*. In an example, the orchestration system 114 instructs the transport systems as to each edge compute site that should share data within a geographic area. The orchestration system 114 can cause the transport systems to determine which edge compute sites should be communicating based on other variables. For example, the orchestration system 114 can cause the transport systems to determine which edge compute sites to communicate with based on the size of the component(s) of the edge compute sites, latency between the edge compute sites, types of connections between the edge compute sites, and so on.

The transport systems 104*a-n* may additionally determine which devices to share the received data with. For example, the transport systems 104*a-n* may determine which devices use the same model(s) and whether the devices should receive the data, the modified data (e.g., feature pairs), and/or the refined model(s). The transport systems 104*a-n* may also protect the data, such as preventing specific portions of the data from being shared directly to devices as will be described in more detail herein.

In addition, the orchestration system 114 may instruct the transport systems 104*a-n* whether to replicate between them raw data received from devices 120*a-n* or modified data that has been processed by a presentation system 108*a-n*. For example, in some instances, orchestration system will track the feature pairs that are being used by the models being maintained on the system 100. For example, presentation systems 108 may report to the orchestration system 114 which feature pairs are being extracted for devices connected to the applicable edge compute site 102. If two edge compute sites 102 are utilizing the same feature pairs for a particular data type, then orchestration system 114 may instruct only modified data (e.g., the output of presentation system 108) to be replicated between the edge compute sites. In this manner, computing and network resources are saved by not unnecessarily replicating all raw data. However, in some instances, different devices and/or models may require that different feature pairs be extracted from the same raw data, in which case the orchestration system may instruct the transport systems to cause replication of raw data received from devices 120*a-n* to one or more edge compute nodes 102 that are utilizing that raw data.

The edge compute sites 102*a-n* may also include session systems 106*a-n*. The session systems 106*a-n* replicate data that the edge compute sites 102 send to other edge compute sites 102. The session systems 106*a-n* may use a distributed data tier to replicate the data. The session systems 106*a-n* may also ensure that the edge compute sites are constantly or periodically communicating to maintain concurrency between the edge compute sites. In an example, the session systems 106*a-n* are database systems that are powered by software such as HarperDB. The session systems 106*a-n* may track the data sent to other edge compute sites 102 and received from other edge compute sites 102. In examples, the session systems track the data sent and received to maintain the consistency of the data accessed by each edge compute site. For example, edge compute site 102*a* receives data from edge compute site 102*n*. Session system 106*a* determines that edge compute site 102*b* has not received the data from edge compute site 102*n* but should receive the data. The session system 106*a* causes the edge compute site 102*a* to replicate and send the data to edge compute site 102*b*. The session system 106*n* may also determine that edge compute site 102*a* sent the data to edge compute site 102*b* so edge compute site 102*n* does not need to send the data. The session systems ensure that each edge site receives the data it should so that each edge site can consistently and uniformly update the related model(s) and/or provide the data to devices 120 so the devices 120 can consistently and uniformly update the related model(s).

As discussed, the edge compute sites 102*a-n* may also include presentation systems 108*a-n*. In examples, the presentation systems 108*a-n* may comprise graphics processing unit (GPU) enabled databases. In one example, the presentation systems 108*a-n* are SQream databases provided by SQream Technologies Ltd. GPU enabled databases allow the presentation systems 108*a-n* to ingest and process large amounts of data (e.g., petabytes of data) continuously. The presentation systems 108*a-n* package and/or conceptualize the data received from devices. For example, the model(s) may not be able to be refined if the received data is directly provided to the model(s).

The presentation systems 108a-n package and/or conceptualize the data for the data to be usable to update the model(s), such as by extracting feature pairs that have an input object and desired output value from the data, transforming the data into normalized form, and/or by removing irrelevant or unnecessary data. In examples, the presentation systems 108a-n continuously consume the received data and refine the data to make it useable for the model(s). In an example, once raw data is replicated and sent to each edge compute site that needs the data, the presentation systems 108a-n can extract multiple feature pairs from the data for different applications and models. Each edge compute site that is processing the data may be applying it to different application and/or models, so each presentation system 108a-n may extract unique feature pairs. The feature pairs that are extracted may be based on the devices in communication with the edge compute site and/or the model(s) that will use the data. The presentation systems 108a-n may refine the data (e.g., extracting feature pairs) based on previous data, the model(s), the use case(s) of the model(s), and/or the objective(s) of the model(s). In examples, the presentation systems 108a-n extract feature pairs from the data based on request(s) from one or more applications (e.g., microservices, APIs) operating in the application systems 110a-n. The applications may be responsible for creating and/or refining model(s) or for gathering modified data that is then used by model systems 116d-i on devices 120a-n to refine model(s).

In examples, the transport systems 104a-n cause the edge compute sites 102a-n to send the modified data output from the presentation system 108 to other edge compute sites for the model(s) to be updated. Thus, the transport systems of the other edge compute sites receiving the data do not need to modify the data. In examples, the edge compute sites may send the modified data to devices that the transport systems determined should receive the data. The devices may use the modified data to update model(s) stored on the devices.

In an example, the received data comprises images captured by a device that uses an image recognition model. The device may be continuously capturing and sending images to the edge telecommunications network system 100 from multiple image capture devices. The device 120a may send the data to edge compute site 102a. The images are different resolutions, have different lighting, and other different attributes. The presentation system 108a refines the received images so the image recognition model can be refined and/or operate correctly. For example, the image recognition model may require each image to be 400 by 400 pixels with uniform lighting. The presentation system 108a can process the images such that each image is 400 by 400 pixels and has uniform lighting. The modified data can then be used by edge compute site 102a and/or the device(s) 120 to refine and/or operate the model.

The edge compute sites 102a-n may also include application systems 110a-n. The application systems 110a-n may comprise content management systems that include applications, microservices, and/or APIs that interact with the devices 120 communicating with or otherwise connected to the edge telecommunications network system 100. In an example, the application systems 110a-n are platform-based services such as Heroku, provided by Heroku, Inc. and Salesforce.com, Inc. In examples, the application systems 110a-n store the model(s) that are provided to the devices communicating with or otherwise connected to the edge telecommunications network system 100. In other examples, the application systems 110a-n manage data for the model(s) that are stored on the model systems 116 and/or stored on the devices connected to the edge telecommunications network system 100. Additionally, the application systems 110a-n may use the received data and/or the data modified by the presentation systems 108a-n to update the model(s). For example, the application systems 110a-n may use the feature pairs extracted by the presentation systems 108a-n to refine one or more models. In another example, an application system, such as application system 110a, provides an API to a device and the received data and/or modified data via network 112a so the device 120a can update a model stored on the device 120a. The data sent to the device 120a may be data received from the device 120 and refined by presentation systems 108. Additionally, the data sent to the device 120a may be data received from a different device 120b-n. The data received from the different device 120b-n may also be refined by one of the presentation systems 108b-n before the data is sent to the edge compute site 102a and/or device 120a.

The edge telecommunications network system 100 also includes an orchestration system 114. In an example, the orchestration system 114 communicates with the edge compute sites 120 of the edge telecommunications network system 100. The orchestration system 114 may build and manage the edge compute sites 120 and may also manage AI/ML models that are used to control the system 100 as a whole. For example, the orchestration system 114 defines how the transport systems 104a-n should determine to communicate with or otherwise connect with each device, what data should be received and/or shared, what devices should share data, data protection requirements, and so on. The orchestration system 114 may determine which edge compute sites 102 will be grouped to communicate and share data and the rules that apply when sharing the data. The orchestration system 114 can send the groupings and the rules to the transport systems 104 for the transport systems to implement. The rules the transport systems 104a-n should follow can be defined and/or maintained within the orchestration system 114 and instantiated on the transport systems 104a-n. The rules may be updated by the orchestration system 114 and sent to the transport systems for implementation so the outdated groupings and rules are no longer followed.

The orchestration system 114 may determine the grouping of edge compute sites 102 that will communicate based on the type of data. For example, edge compute sites 102 located in the United States (US) may be grouped to share data gathered by vehicles traveling in the US. The data may be used by the US edge sites to refine self-driving models specific to US roads and US driving rules. Therefore, the orchestration system 114 may not include edge compute sites 102 outside the US or that do not communicate with devices located in the US in the US driving data group. The orchestration system 114 may additionally set rules regarding whether the data should be sent to other edge compute sites 102 before the data is modified by the presentation systems or after. For example, the edge compute sites in a group are maintaining the same model and will use the data in an identical way to refine the model. The orchestration system 114 may establish a rule that the presentation system of the edge compute site that receives the data should modify the data and the edge compute site 102 should replicate and send the modified data to the other edge compute sites 102. This prevents the presentation systems 108 of the other edge compute sites 120 from unnecessarily performing the same work as the first presentation system 108. The rule may also optimize bandwidth used when transporting the data and/or reduce the latency when sending the data. In another example, the edge compute sites 102 may use the models in different ways. The orchestration system 114 may implement a rule that the raw data received from devices 120 should be sent to certain of the edge compute sites 102 instead of data modified by a presentation system 108. The orchestration system 114 may establish a combination of the rules for each edge compute site 102 to optimize the amount of work the presentation systems 108 are responsible for.

The edge telecommunications network system 100 may protect the data that is received. For example, the edge telecommunications network system 100 may tag each element of the received data with a security value. In examples, the transport systems 104 and/or the presentation systems 108 tag the received data with the security value. The security value may be based on the characteristics of the data, such as whether the data includes sensitive information and whether the data has potential for abuse. The security value may also be based on whether the data can be used with sensitive parts of the data being obfuscated or otherwise removed. Once the data is modified by presentation system, if the sensitive parts of the data are not included, a low security value can be assigned. For example, the presentation system may extract feature pairs from the data that do not include sensitive information. The features pairs can be assigned a low security value and be sent to devices since the sensitive data is excluded. In examples, when the sensitive information cannot be removed, devices 120 may be restricted from receiving the data. The model may be refined by the edge compute site(s) 102 and then provided to the device(s) 120. Therefore, the devices 120 can access the refined model without accessing the information. In other examples, only devices 120 with authorization to receive data having the security value may receive the data.

The security value may also be represented when the data is modified by the presentation systems 108 to extract feature pairs for models to ingest or otherwise utilize. In examples, artificial-intelligence and/or machine-learning models use feature pairs determine measurable properties and characteristics of the data. The feature pairs may be used to determine what uses of the data are acceptable. The edge telecommunications network system 100 may also monitor the data to determine how the data should be used. In an example, the presentation systems 108 monitor the data. In an example, there may be a monitoring policy that defines the acceptable uses of the data. The data may be monitored to determine whether the data may be used to refine models stored on the model systems 116 of the edge compute sites 102, sent directly to devices 120, and so on.

The application layer or application system 110 may use an identity access management capability to determine how the data can be accessed and by which devices. For example, the application system 110 may determine whether humans can access data directly or if the data should be accessible only by automated processes. The application system 110 may also determine whether the data is related to a public or private edge service. If the data is related to a private edge service, the data may be shared only with devices having permission to access data related to the private edge service.

The data may also be protected by restricting access to data. For example, if a model is refined autonomously, the restrictions may be lower than if data can be accessed by a person. In examples, the application systems 110 protect the data with an identity access management capability. The identity access management capability can determine which devices 120 and/or user can access which data.

Figure 2:
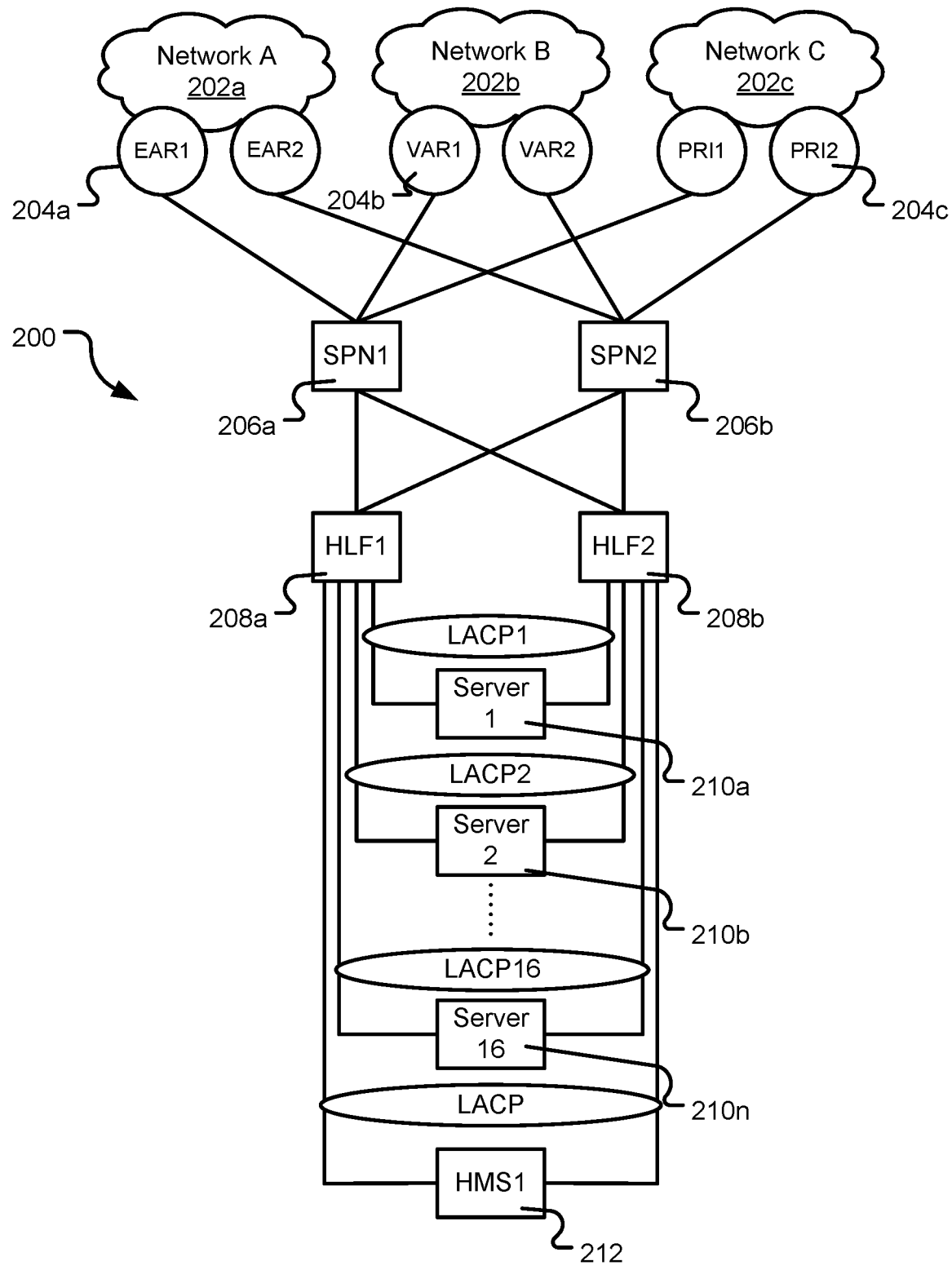
FIG. 2 is a schematic diagram illustrating an edge compute environment of an edge site of a network in accordance with one embodiment.

FIG. 2 is a schematic diagram illustrating an edge compute environment 200 of an edge site of a network in accordance with one embodiment. In general, the edge compute environment 200 of FIG. 2 illustrates one example of components of an edge compute site 102 of a network or collection of networks 202a-202c from which compute, data, and capability services may be provided to devices connected or otherwise in communication with the edge site. As mentioned above, by providing the environment 200 in an edge site of the network 202, compute, data, and capability services may be provided to devices with a lower latency than if the compute environment is included deeper within the network or further away from the requesting device of the network. It should be appreciated, however, that an edge compute system may include more or fewer components than those illustrated in FIG. 2 and may be connected in other configurations than shown. Rather, the edge compute environment 200 of FIG. 2 is but one example of an edge compute system 200 for providing compute services to devices or networks connected to or otherwise in communication with the edge compute system.

In the instance shown, the components of the system 200 may be installed or associated with a network site at the edge of one or more networks 202a-c. In general, an edge site of a network is a network site in which devices such as customer equipment may connect to the network 202 for access to services and transmission routes of the network. Further and as discussed above, the network 202 may include more than one public and/or private network interconnected to form a general network 202. Each network instance may include one or more edge devices 204 that provide gateways or ingress/egress devices for the associated network. In FIG. 2, network 202a may include edge devices 204a, network 202b may include edge devices 204b, and network 202c may include edge devices 204c. Each edge device 204 of the networks 202 may connect or otherwise communicate with one or more spine switch devices 206a-b. One or more host leaf switches 208a-b may interconnect with the one or more spine switch devices 206a-b of the environment 200 to form a switch mesh for connecting to the network 202 via edge devices 204. In some instances, more or fewer spine switch devices 206 and/or host leaf switches 208 may be included in the edge compute environment 200. Further, each spine switch 206 and host leaf switch 208 may provide redundancy failover services for a corresponding switch.

One or more bare metal servers 210a-n or other types of servers may be connected to each host leaf switch 208. In one implementation, the servers 210 may host and execute applications to provide particular services to devices and customers of the network 202. For example, the servers 210 may be configured to provide compute services (as well as other cloud computing services) to customers in communication with the servers 210. In another example, the servers 210 may be configured to provide data and capability services to enable artificial intelligence capabilities of devices in communication with servers 210. Further, although 16 such servers are illustrated in FIG. 2, the environment 200 may include more or fewer servers 210 for providing services to customers. The environment 200 may also include a host management switch 212 connected to the host leaf switches 208 for managing aspects of the switching mesh and communications to/from the servers 210. Through the environment 200 of FIG. 2, an edge compute service may be provided to devices and customers of the network 202 requesting such services from the network 202 while reducing the latency of providing the services to the devices and customers.

Figure 3A:
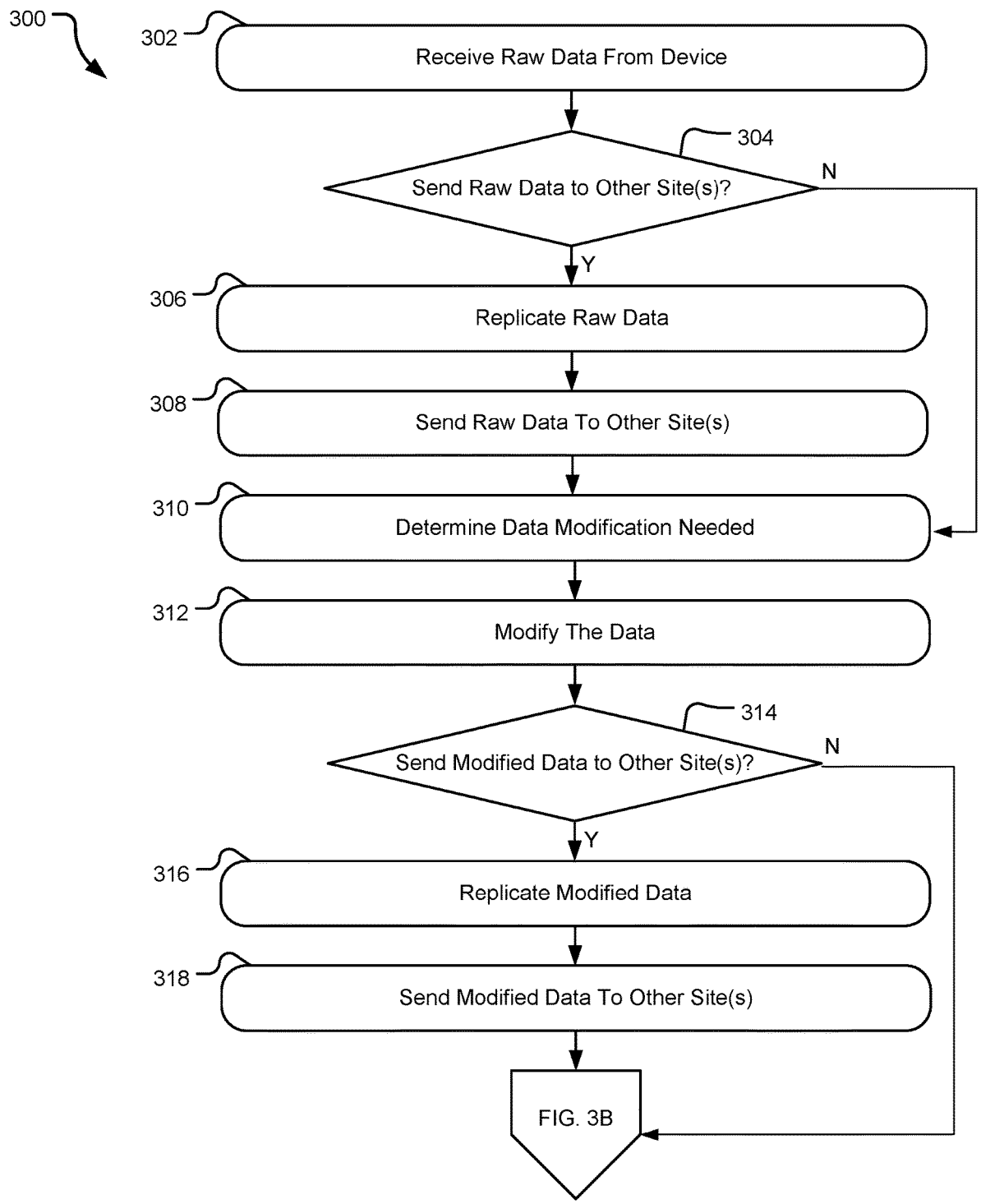
FIG. 3A and FIG. 3B are a flowchart illustrating a method for enabling devices using a model and connected to an edge compute network to operate.
Figure 3B:
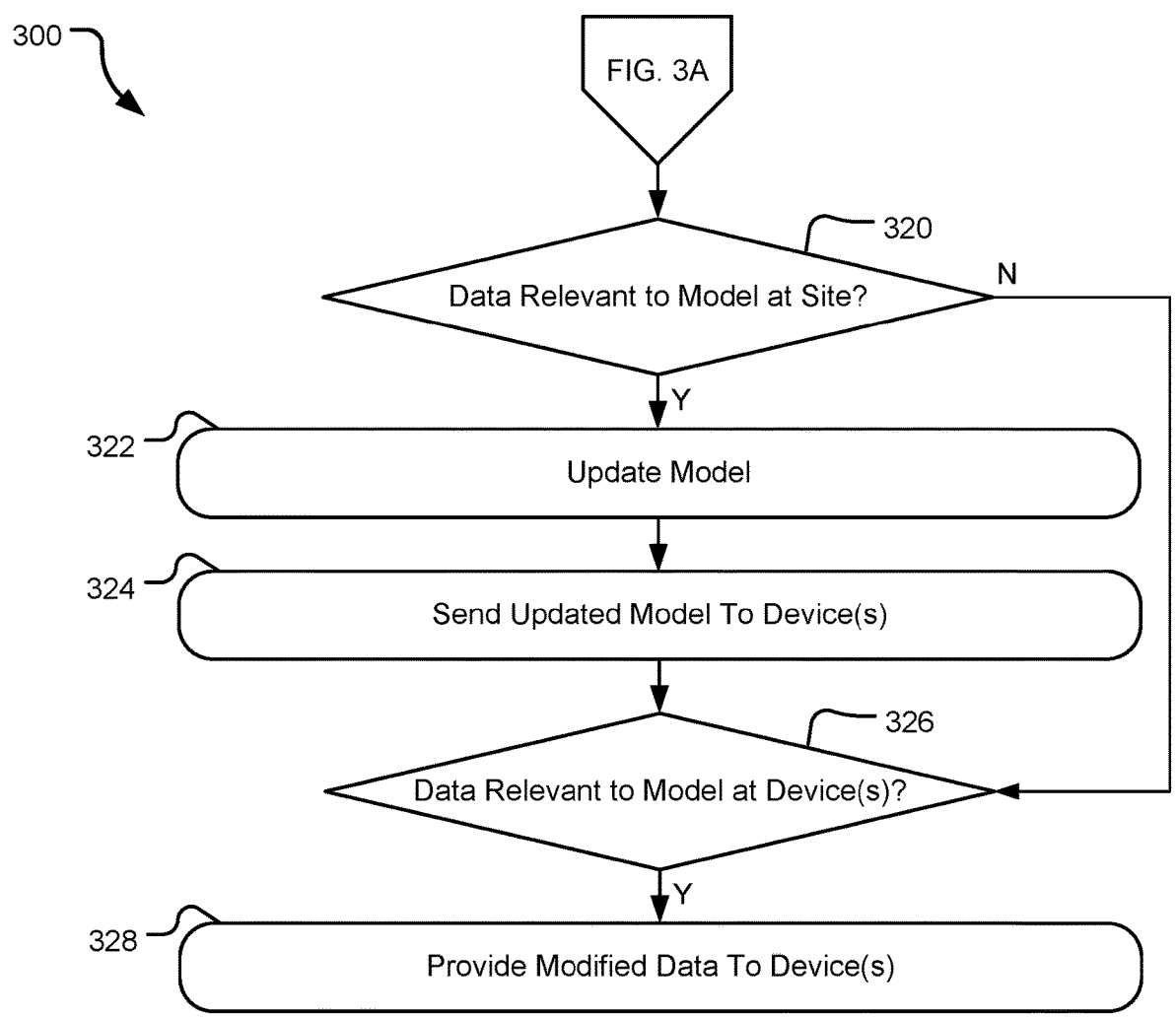

FIG. 3A and FIG. 3B comprise a flowchart illustrating a method 300 for enabling devices using a model and connected to an edge compute network to operate. In some implementations, one or more of the operations of the method 300 may be performed by the edge telecommunications network system 100. In other implementations, one or more of the operations may be performed by other components of the edge compute sites 102 or still other systems. The operations may be executed by hardware components of the relevant systems, software programs of the systems, or a combination of hardware and software components of the system. Some operations may be combined into a single operation or performed in a different order than illustrated in method 300.

Beginning in FIG. 3A, flow starts at operation 302. In operation 302 data is received from a device. For example, the edge telecommunications network system 100 may receive data from a device 120a communicating with edge compute site 102a via network 112a. In general, the data may be any type of data sent by the device.

Once the data is received, flow proceeds to operation 304, and it is determined whether the raw data should be sent to other sites. In examples, an orchestration system, such as orchestration system 114, may have provided rules and groupings of edge compute sites 102 to the transport system 104 of the edge compute site 102. The edge compute site can determine whether the raw data should be sent to other edge compute sites based on the grouping and/or rules. For example, edge compute site 102a determines the raw data should be shared with edge compute site 102b but not edge compute site 102n based on the type of data received. Data may be sent to any number of edge compute sites 102. In examples, which edge compute sites 102 receive the data is based on the type of data received and/or the model associated with the data. In other examples, which edge compute sites 102 receive the data is based on the locations of the sites relative to the edge compute site 102 that received the data.

If the edge compute site determines that the raw data should be sent to other sites, flow then proceeds to operation 306 and the data is replicated. For example, the session systems 106 may replicate the raw data so that it may be sent to other sites.

In operation 308, the data is sent to the other sites. For example, the replicated data is sent to the sites the transport system of the edge compute site determines the data should be sent to.

Once the data is sent to the other sites or it is determined that data should not be sent to other sites in operation 304, flow proceeds to operation 310. In operation 310, it is determined what modification to the data is needed. The modification may be determined, e.g., by the presentation system 108 so the data may be used to refine a model. For example, the presentation system 108a may determine to extract feature pairs from the data that a particular model can use (e.g., a model stored by model system 116d). If raw data was shared with other edge compute sites 102b-n, then the presentation systems 108b-n at those respective edge compute sites 102b-n may determine to extract feature pairs from the data that a particular model can use (e.g., a model stored by model systems 116f-i).

Flow proceeds to operation 312, and the data is modified. In examples, the data is modified based on how the presentation system 108 determines the data should be modified in operation 310. For example, the presentation system 108 may extract certain feature pairs from the data needed by particular models stored and/or remove unnecessary or irrelevant data. In examples, the raw data may be too large to be efficiently consumed by a model. As such, the data may be modified by sampling the data. For example, if the raw data contains one year of performance metrics and event logs for particular computing cards in a plurality of servers in a network, the data may be modified by sampling the data in intervals (e.g., once a day) for a shorter period and only for certain feature pairs proven to be predictive of performance. In addition, the sampling could be done for related cards (e.g., each failed card and a corresponding, related healthy card) so that the model can be trained to recognize differences between healthy cards and similarly situated cards that have (or are predicted to) fail.

Once the data is modified, flow proceeds to operation 314. In operation 314, it is determined whether the modified data should be sent to other sites. As explained above, in examples, the modified data may be provided to other edge compute sites 102 if the sites 102 are refining the same model in the same way. Providing the modified data may avoid the presentation systems 108 of the other edge compute sites 102 from having to modify the data in the same way. In examples, the orchestration system 114 may provide rules and groupings of edge compute sites to the transport systems 104 of the edge compute sites 102. The edge compute site 102 can determine whether the data should be sent to other edge compute sites 102 based on the grouping and/or rules. For example, the transport system 104 may have a group that uses the received data in the same way, so the transport system determines to share the modified data.

If it is determined that the modified data should be shared, flow proceeds to operation 316. In operation 316, the modified data is replicated. The data may be replicated in the same way described above in operation 306.

Once the modified data is replicated, flow proceeds to operation 318, and the modified data is sent to the other edge compute sites 102. The modified data may be shared in the same way described above in operation 308, e.g., based on rules and groupings of edge compute sites 102 provided to the transport systems 104 by an orchestration system 114.

Proceeding to FIG. 3B, once the modified data is sent to other sites or it is determined that the modified data should not be sent to other sites in operation 314, flow proceeds to operation 320. In operation 320, it is determined whether the data is relevant to a model at the site. For example, edge compute site 102a may determine that the data may be relevant to a model stored in the model system 116a of the edge compute site 102a.

If it is determined that the data is relevant to a model at the site, flow proceeds to operation 322, and the model is updated. For example, an application stored in the application system 110a of the edge compute site 102a may use the modified data to refine the model stored in model system 116a. For example, the application system 110a may obtain feature pairs to the model for the model to ingest.

Once the model is updated, flow proceeds to operation 324. In operation 324, the updated model is sent to one or more devices 120. For example, the orchestration system 114 and/or transport system 104a of the edge compute site 102a may provide indication of which devices (e.g., 120a and 120b) use the model. The edge compute site can provide the updated model to those devices 120.

Method 300 may also include operation 326. In operation 326, it is determined whether the modified data is relevant to a model at one or more devices. For example, the modified data may be relevant to devices in communication with the edge compute site. The orchestration system 114 and/or the transport system of the edge compute site 102 may determine whether at least one of the devices 120 in communication with the edge compute site 102 has a model to which the data is relevant. In examples, the devices 102 may subscribe to one or more services provided by the application system 110 to receive data relevant to the model(s) used by such device(s) 120. In some examples, if the updated model is provided to the devices 120 at operation 324, then the modified data may not be provided to the devices 120. In other examples, the modified data may be provided to the devices 120 in addition to, or in lieu of, a modified model, and the devices 120 may update the models themselves.

If it is determined that the data is relevant to a model at one or more devices, the modified data is provided at operation 328 to the device(s). In nonexclusive examples, the modified data may be relevant to devices 120 connected to vehicles that use a self-driving model. In those examples, the edge compute site 102 may provide the modified data to devices 120 connected to vehicles that use the self-driving model so that such devices can update their respective models.

In examples, the models can then be used at the devices, and at the sites, to make predictions, e.g., about site and device performance and to potentially take mitigating actions. In other examples, the models can be used to provide alerting either to one or more machines and/or to human operators. For example, if the models have been trained to recognize network computing cards that are about to fail at certain devices or sites, an operator may be alerted and/or an automated procurement process may be initiated to order a replacement before the card fails. The procurement process may, for example, include automatically ordering the required replacement, shipping the required replacement to the appropriate address, and generating a service ticket to replace the part predicted to fail prior to such failure occurring. In another example, if the model is relevant to a self-driving application, the model can be used to improve object recognition and/or autonomous driving behavior of a vehicle, among other things.

Further, alerting that is performed using the improved models can be based on specific criteria and be priority-based. For example, one implementation of the present systems and methods may include providing autonomous network management. This may include capturing and evaluating data related to route congestion, bandwidth availability, latency, and traffic priorities at different sites and devices comprising, or connected to, the network. The alerting thresholds may be based on type of traffic, protocol, and transmission control protocol (TCP) header flags. For example, extensible messaging and presence protocol (XMPP) traffic carrying voice over internet protocol (VoIP) has a lower latency tolerance than XMPP carrying internet of things (IoT) data. The XMPP protocol is typically prioritized over hypertext transfer protocol secure (HTTPS) traffic—because HTTPS has a higher tolerance for latency. The present systems and methods could be used to train models throughout the network to automatically perform route optimization—beyond the traditional network control plane built into the application specific integrated circuits (ASICs) and software defined networking (SDN) equipment such as routing information protocol (RIP) version 2, open shortest path first (OSPF)—allowing dynamic reconfiguration of virtual switches within a data center to optimize bandwidth availability.

Figure 4:
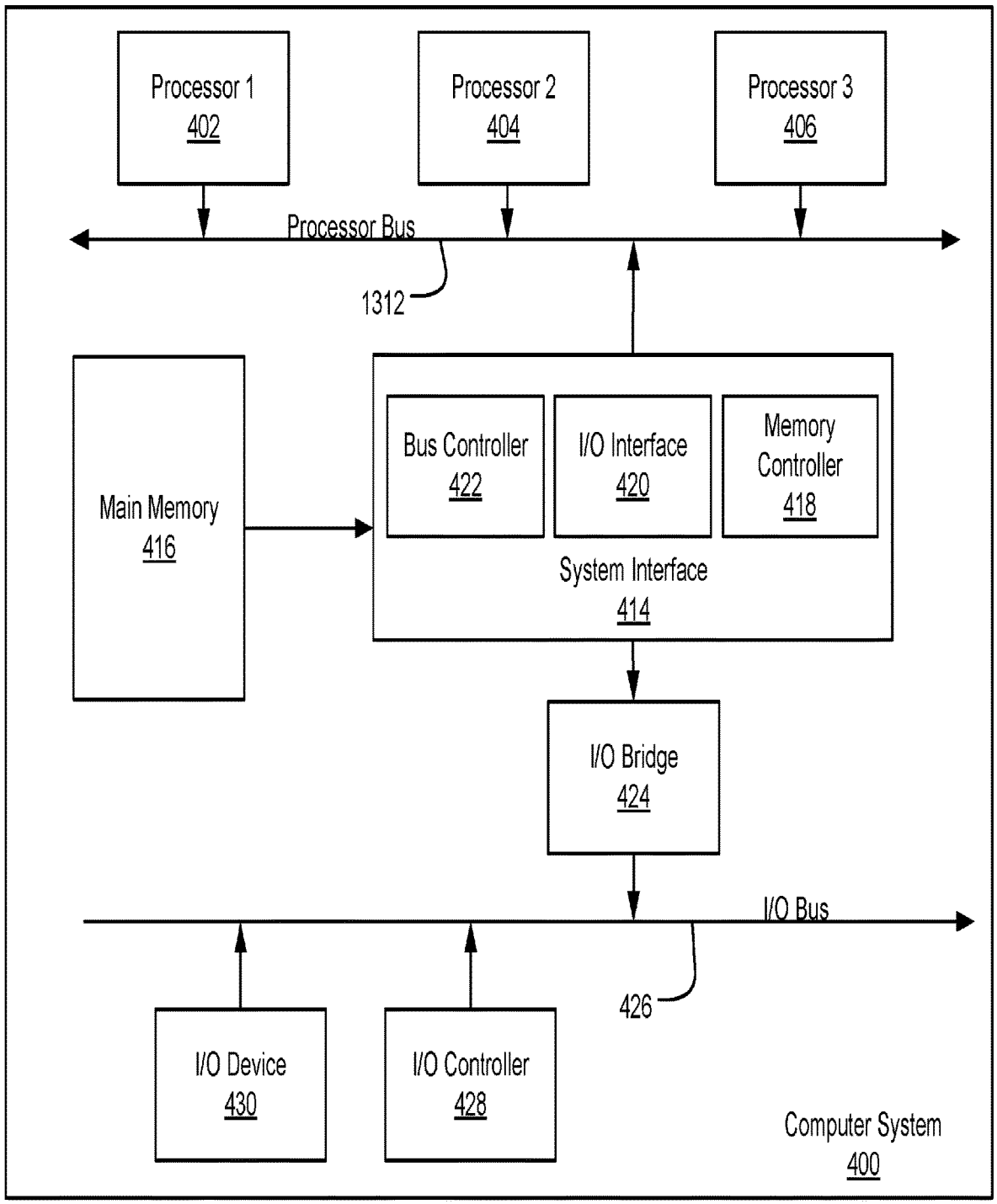
FIG. 4 is a block diagram illustrating an example of a computing device or computer system.

FIG. 4 is a block diagram illustrating an example of a computing device or computer system 400 which may be used in implementing the examples of the components of the network disclosed above. For example, edge compute systems 102, orchestration system 114 and/or devices 120, discussed above may comprise the computing system 400 of FIG. 4. The computer system (system) 400 includes one or more processors 402-406. Processors 402-406 may include one or more internal levels of cache (not shown) and a bus controller or bus interface unit to direct interaction with the processor bus 412. Processor bus 412, also known as the host bus or the front side bus, may be used to couple the processors 402-406 with the system interface 414. System interface 414 may be connected to the processor bus 412 to interface other components of the system 400 with the processor bus 412. For example, system interface 414 may include a memory controller 414 for interfacing a main memory 416 with the processor bus 412. The main memory 416 typically includes one or more memory cards and a control circuit (not shown). System interface 414 may also include an input/output (I/O) interface 420 to interface one or more I/O bridges or I/O devices with the processor bus 412. One or more I/O controllers and/or I/O devices may be connected with the I/O bus 426, such as I/O controller 428 and I/O device 430, as illustrated.

I/O device 430 may also include an input device (not shown), such as an alphanumeric input device, including alphanumeric and other keys for communicating information and/or command selections to the processors 402-406. Another type of user input device includes cursor control, such as a mouse, a trackball, or cursor direction keys for communicating direction information and command selections to the processors 402-406 and for controlling cursor movement on the display device.

System 400 may include a dynamic storage device, referred to as main memory 416, or a random access memory (RAM) or other computer-readable devices coupled to the processor bus 412 for storing information and instructions to be executed by the processors 402-406. Main memory 416 also may be used for storing temporary variables or other intermediate information during execution of instructions by the processors 402-406. System 400 may include a read only memory (ROM) and/or other static storage device coupled to the processor bus 412 for storing static information and instructions for the processors 402-406. The system set forth in FIG. 4 is but one possible example of a computer system that may employ or be configured in accordance with aspects of the present disclosure.

According to one example, the above techniques may be performed by computer system 400 in response to processor 404 executing one or more sequences of one or more instructions contained in main memory 416. These instructions may be read into main memory 416 from another machine-readable medium, such as a storage device. Execution of the sequences of instructions contained in main memory 416 may cause processors 402-406 to perform the process steps described herein. In alternative examples, circuitry may be used in place of or in combination with the software instructions. Thus, examples of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media and may include removable data storage media, non-removable data storage media, and/or external storage devices made available through a wired or wireless network architecture with such computer program products, including one or more database management products, web server products, bare metal server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 406 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in main memory 416, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

Examples of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary examples discussed without departing from the scope of the present invention. For example, while the examples described above refer to particular features, the scope of this invention also includes examples having different combinations of features and examples that do not include all of the described features. Accordingly, the scope of the present invention is intended to embrace all such alternatives, modifications, and variations together with all equivalents thereof.

While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an example in the present disclosure can be references to the same example or any example; and such references mean at least one of the examples.

Reference to "one example" or "an example" means that a particular feature, structure, or characteristic described in connection with the example is included in at least one example of the disclosure. The appearances of the phrase "in one example" in various places in the specification are not necessarily all referring to the same example, nor are separate or alternative examples mutually exclusive of other examples. Moreover, various features are described which may be exhibited by some examples and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various examples given in this specification.

Without intent to limit the scope of the disclosure, examples of instruments, apparatus, methods, and their related results according to the examples of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure are set forth in the description, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

We claim:

1. A method, comprising:

receiving, at a first edge compute site of a telecommunications network, raw data from a first device over a first access network;

determining, by the first edge compute site, that the raw data needs to be modified for consumption by a first model;

modifying the raw data to generate modified data, wherein modifying the raw data to generate the modified data comprises generating first modified data by extracting a first set of feature pairs from the raw data for use in the first model;

modifying the first model using the modified data to generate a modified first model;

sending the modified first model to at least one device connected to the first edge compute site;

using the modified first model to automatically affect operation of at least one of the first edge compute site or the at least one device; and using the first modified data to modify the first model at the first edge compute site.

2. The method of claim 1, further comprising:

receiving, by the first edge compute site, second modified data related to a second model, from a second edge compute site.

3. The method of claim 2, further comprising:
modifying the second model at the first edge compute site; and
providing, by the first edge compute site, the modified second model to a second device.

4. The method of claim 2, further comprising:
evaluating the second modified data to determine a security value for the second modified data;
based on determining the security value, determining, by the first compute site, whether to provide the second modified data to a second device.

5. The method of claim 2, further comprising:
providing the second modified data by the first edge compute site to a second device over the first access network.

6. The method of claim 1, further comprising:
receiving, from a network orchestration system at the first edge compute site, instructions to provide the modified data to a second edge compute site and the modified first model to a second device.

7. The method of claim 6, further comprising:
receiving updated instructions from the network orchestration system at the first edge compute site to no longer provide updates to modified data or the modified first model to the second edge compute site.

8. The method of claim 6, further comprising:
receiving, from the network orchestration system at the first edge compute site, instructions to provide the raw data to a third edge compute site but not provide the raw data to the second edge compute site.

9. The method of claim 1, wherein modifying the raw data to generate the modified data further comprises generating second modified data by extracting a second set of feature pairs from the raw data for use in a second model, the method further comprising:
sending the second modified data to a second edge compute site.

10. A system, comprising:
at least one processor;
memory, operatively connected to the at least one processor and storing instructions that, when executed by the at least one processor, cause the system to perform a method, the method comprising:
receiving, at a first edge compute site of a telecommunications network, raw data from a first device over a first access network;
determining, by the first edge compute site, that the raw data needs to be modified for consumption by a first model;
modifying the raw data to generate modified data, wherein modifying the raw data to generate the modified data comprises generating first modified data by extracting a first set of feature pairs from the raw data for use in the first model;
modifying the first model using the modified data to generate a modified first model;
sending the modified first model to at least one device connected to the first edge compute site;
using the modified first model to automatically affect operation of at least one of the first edge compute site or the at least one device; and
using the first modified data to modify the first model at the first edge compute site.

11. The system of claim 10, wherein the method further comprises:
receiving, by the first edge compute site, second modified data related to a second model, from a second edge compute site.

12. The system of claim 11, wherein the method further comprises:
modifying the second model at the first edge compute site; and
providing, by the first edge compute site, the modified second model to a second device.

13. The system of claim 11, wherein the method further comprises:
evaluating the second modified data to determine a security value for the second modified data;
based on determining the security value, determining, by the first compute site, whether to provide the second modified data to a second device.

14. The system of claim 11, wherein the method further comprises:
providing the second modified data by the first edge compute site to a second device over the first access network.

15. The system of claim 11, wherein the method further comprises:
receiving, from a network orchestration system at the first edge compute site, instructions to provide the modified data to the second edge compute site and the modified first model to a second device.

16. The system of claim 15, wherein the method further comprises:
receiving updated instructions from the network orchestration system at the first edge compute site to no longer provide updates to modified data or the modified first model to the second edge compute site.

17. The system of claim 15, wherein the method further comprises:
receiving, from the network orchestration system at the first edge compute site, instructions to provide the raw data to a third edge compute site but not provide the raw data to the second edge compute site.

18. The system of claim 10, wherein modifying the raw data comprises extracting feature pairs from the raw data, wherein modifying the raw data to generate the modified data further comprises generating second modified data by extracting a second set of feature pairs from the raw data for use in a second model, and wherein the method further comprises:
sending the second modified data to a second edge compute site.

* * * * *